(12) United States Patent
Stewart et al.

(10) Patent No.: US 6,345,593 B1
(45) Date of Patent: Feb. 12, 2002

(54) DEVICE FOR PETS

(75) Inventors: Frances Todd Stewart, Pittsburgh, PA (US); Raymond Ho-Cheong Cheng, Hong Kong (CN)

(73) Assignee: Creative Products International, Pittsburgh, PA (US)

( * ) Notice: Subject to any disclaimer, the term of this patent is extended or adjusted under 35 U.S.C. 154(b) by 0 days.

(21) Appl. No.: 09/504,452

(22) Filed: Feb. 16, 2000

Related U.S. Application Data (60) Provisional application No. 60/120,333, filed on Feb. 17, 1999.

(51) Int. Cl.[7] .............................................. A01K 29/00
(52) U.S. Cl. ........................ 119/706; 119/707; 119/708
(58) Field of Search ................................ 119/706, 702, 119/707, 708, 711, 609, 627; 446/227

(56) References Cited

U.S. PATENT DOCUMENTS

| | | | |
|---|---|---|---|
| 3,599,606 A | | 8/1971 | Hayward ..................... 119/174 |
| 3,927,482 A | * | 12/1975 | Marcus ........................ 40/455 |
| 4,517,922 A | | 5/1985 | Lind .......................... 119/708 |
| 4,577,590 A | * | 3/1986 | Skroch ........................ 119/706 |
| 4,930,448 A | * | 6/1990 | Robinson ..................... 119/708 |
| 4,983,890 A | * | 1/1991 | Satoh et al. ..................... 318/3 |
| 5,103,770 A | * | 4/1992 | Berkovich .................... 119/708 |
| 5,146,702 A | * | 9/1992 | Belokin, Jr. ................. 40/430 |
| 5,322,036 A | * | 6/1994 | Merino ........................ 119/707 |
| 5,605,533 A | * | 2/1997 | Badilla ........................ 601/103 |
| 5,651,332 A | * | 7/1997 | Moore et al. ................. 119/708 |
| 5,657,721 A | * | 8/1997 | Mayfield et al. ............. 119/707 |
| 5,823,844 A | * | 10/1998 | Markowitz ................... 446/175 |
| 5,875,737 A | * | 3/1999 | Boshears ..................... 119/706 |
| 5,951,360 A | * | 9/1999 | Fearon et al. ............... 446/227 |
| 6,058,887 A | * | 5/2000 | Silverman ................... 119/609 |

* cited by examiner

Primary Examiner—Charles T. Jordan
Assistant Examiner—Yvonne R. Abbott
(74) Attorney, Agent, or Firm—Andrew T. Cornelius (57) ABSTRACT

A combination scratching post with a touch activated component and motorized mechanism for domestic cats that moves a mouse toy in an irregular manner that is intended to attract cats for the purpose of using the scratching post for play and exercise as well as grooming in the form of cleaning and sharpening its claws on the scratching post. The mouse toy is constructed in such a way as to allow the inside to be filled and refilled with catnip, a substance which cats find attractive, each time being resealed by means of an enclosure at the base of the toy. The mouse toy is activated to move via a motor inside the scratching post by a two step procedure. First, the device is "turned on" by a switch at the base of the post. This action does not activate the motor. Instead, it activates the touch-activated components and motorized mechanism which cause the coiled spring at the top of the post to turn and move in an irregular motion related to the power and frequency of the force applied to the post or base for an irregular period of time. This irregular pattern of movement of the mouse toy further actuated by a spring-loaded base is intended to create greater interest in the toy from the cat, challenging the cat into play and encouraging the cat to use the scratching post for exercise and grooming.

21 Claims, 7 Drawing Sheets

FIG. 2A CAT TOY CIRCUIT DIAGRAM

FIG. 2C BLOCK DIAG. FOR CURRENT PROCESS

FIG. 2B

Enlargement of plastic gear which is attached to pin that comes from motor and makes the toy on the coiled wire spin

FIG. 4

SPLIT BLACK WIRES ARE NEGATIVE

SPRING #78

BATTERY DOOR CONTACT PLATE #76

© 1998 CREATIVE PRODUCTS INTL'

BATTERY DOOR WITH CONTACT PLATE & SPRING

BATTERY DOOR #74

FIG. 8

DEVICE FOR PETS

CROSS REFERENCE TO RELATED APPLICATIONS

This application claims the benefit of copending U.S. Provisional Application No. 60/120,333, filed Feb. 17, 1999, by the same inventors.

BACKGROUND OF THE INVENTION

The present invention relates to devices for pets, and, more particularly, to a device for a pet that attracts the pet to the device.

The conventional device known as a scratching post typically consists of a base and a cylinder, both of which are covered with carpeting. The intent of this device is to provide a place where a cat or other animal can scratch its front claws, providing both a grooming activity and a recreational device for the cat, as well as a diversion from the cat performing its scratching activities on household furnishings. The grooming activity performed relates to the cat's need to clean its claws and sharpen them, such activity with a scratching post may be performed by the cat by standing on its hind legs, reaching its front legs to the extent that it is able, leaning against a surface into which the claws of its front feet can at least somewhat penetrate and then drawing the front claws down the length of the surface. Typically, a cat repeats this activity several times per day, with a detrimental effect on the surface of the chosen household furnishing.

The conventional scratching post is designed to provide an alternative surface for the cat's scratching activities. Therefore, cat owners often provide a scratching post in the cat's indoor environment in order to provide the cat a surface to perform the necessary grooming function of scratching. Cats, however, more often respond to movement and a conventional, stationary scratching post in itself is not necessarily inherently attractive to a cat, and the cat may choose not to use it.

Therefore, there is a need for a device for an animal that includes a recreational feature intended to attract the animal to the device. There also exists a need for a scratching post for an animal which will not only attract an animal to it but hold the animal's attention to motivate the animal to use it.

SUMMARY OF THE INVENTION

The present invention provides a device for an animal that includes a recreational function that is intended to attract the animal's attention.

The preferred embodiment of the present invention is a combination carpeted scratching post and motorized toy, which addresses both the animal's need for cleaning and sharpening its claws via the movement of scratching as well as the animal's need for exercise and physical activity, and which is intended to attract the animal's attention to increase the chance that the animal will make use of the scratching post.

The scratching post of the preferred embodiment includes a fabric toy in the shape of a mouse attached to the top of the scratching post by means of a 9½ inch coiled wire, 0.01 mm in diameter. The coiled wire is attached to the top of the post by a plastic fitting or mounting in such a manner that the mouse end of the wire can be rotated by a motor. The fabric mouse toy is fashioned in such a way to allow the inside to be filled with catnip, a substance with a scent that cats find attractive. Conventional catnip toys have been assembled in such a way as to allow limited usage; once the catnip scent inside the toy has been depleted, the usefulness of the toy as a means of attracting a cat is compromised. In the preferred embodiment, however, the fabric toy has been constructed in a fashion that allows it to be repeatedly refilled with catnip, each time resealed by means of a "hook and loop" type enclosure (of the type made from components marketed under the trademark "VELCRO") at the base of the toy. The toy can be removably attached to the end of the wire with a common bracelet "double ring" clasp, to permit the toy to be replaced with another mouse or with a toy having some different shape (for example, a bird).

The principal feature of the preferred embodiment, a touch activated component and motorized mechanism, sets this concept apart from conventional scratching posts. The mouse toy is moved via a motor inside the post. The touch activated component and motorized mechanism can be activated by a person or a cat by simply tapping or scratching the base or post of the scratching post. This movement is further enhanced and facilitated in the preferred embodiment by four spring feet or mountings on the base of the toy which add to the sensitivity of the device to touch. In some cases the sensitivity of the springs may translate into the activation of the touch activated component and motorized mechanism by the vibration generated through the surface on which the toy rests (as on a wooden floor). In order for the touch activated component and motorized mechanism in the preferred embodiment to be "turned on" the following procedure must happen. First, the device must be "turned on" by means of an on/off switch at the base of the post. The switch does not activate the motor. Instead, it makes the electrical power source (D size flashlight batteries in the case of the preferred embodiment) available to the touch-activated component of the toy. When the base or post of the toy is tapped or scratched the touch activated component supplies electricity from the power source to the motor, which causes the coiled spring at the top of the post to move. The nature of this motion is related to the power and frequency of the touch to the post or base. The touch activated component and motorized mechanism purposely creates an irregular pattern of movement to the mouse toy, which conveys a more lifelike motion to the toy and a greater interest for the cat, challenging the cat into play and encouraging the cat to use the scratching post for amusement, exercise and grooming.

The present invention contemplates any device for a pet that is animated by a touch activated component and motorized mechanism for the purpose of amusing the pet. As used herein, "motor" includes any device that gives motion to an object. Thus, the present invention substantially departs from the conventional concepts of devices for domestic animals. No known device provides the benefits and attributes of the present invention. Additionally, conventional devices do not suggest the present inventive combination of component elements arranged and configured as disclosed and claimed herein.

BRIEF DESCRIPTION OF THE DRAWING

The following detailed description of the preferred embodiment may be understood better if reference is made to the appended drawing, in which.

DETAILED DESCRIPTION OF THE PREFERRED EMBODIMENT

The present invention provides a carpeted scratching post for cats as well as a touch-activated component and motorized mechanism that is useful in providing entertainment, movement and exercise for the cat and incentive to use the scratching post and base to perform necessary grooming activities of cleaning and sharpening its claws. While a motorized scratching post is shown in the drawing, the invention provides any device for a pet that is animated by a touch activated component and motorized mechanism. Also, while this detailed description makes reference to a touch activated component and motorized mechanism, it should be understood that in the preferred embodiment, as will be appreciated from the drawing and the following description, touching the device will activate the motor of the device only when any resulting movement of the device is sufficient to move the touch activated components into contact with each other.

Generally, the scratching post includes a base that is 10½ inches square by 1 inch deep. A hole approximately 2 inches in diameter is centered in the base and threaded. The base also has four, 1 inch square, non-skid, spring-loaded pads for support. The base is made of heavy, high-impact polystyrene plastic and provides the foundation for the post and wire described below.

The main body of the post is a 2½ inch wide by 14 inch long cylinder of heavy, high-impact polystyrene plastic; the bottom end of the post has an opening 1⅞ inches wide by ⅞ inch long that is threaded to match the opening in the center of the base. The post is mounted to the base by threading the bottom of the post into the threaded opening in the base. A locking cap with a coiled spring that serves as a battery contact when in place holds three "D" size flashlight batteries within a battery compartment formed in the post.

The main body of the post consists of two separate parts, one for the right side and one for the left, which fit together to form the complete post. It is held together by 6 number 6 screws measuring 2 inches each. Immediately above the locking cap is a chamber to hold three 1.5 volt batteries (standard size D flashlight batteries) which provide the power source to the motor. Immediately above the batteries is a bus plate, or battery contact plate, which provides electrical contact with the power source to the internal particle chip (PC) board which in turn provides the circuitry for the operation of the motor which controls the motion and turning of the plastic motor shaft fitting, which turns the external coiled spring wire holding the toy mouse on the outer end of the coil. The motor operates at 3600 rpm with a drawing source of 0.75 milliamps (MI) per hour.

A three pole switch (only two poles are used) at the base of the post is used to control the application of battery power to the PC board, which is mounted to an interior surface of the post toward the top of the post. The PC board includes a 33 microfarad capacitor and also a 1K ohm resistor, a 0.1 microfarad ceramic capacitor, and a series/parallel arrangement of two transistors, one CD9014 NPN epitaxial silicon transistor for the primary transistor and one CD8050 NPN epitaxial silicon transistor for the secondary transistor, which drive in series a small direct current motor of 3 volts which operates at 3600 rpm drawing 0.75 milhamps. The motor turns a plastic fitting or mounting secured to the motor shaft. The touch activated components of the scratching post are also mounted to the PC board. When the touch activated components are actuated by movement of the scratching post, battery power is supplied to the motor by the components of the PC board to operate the motor.

The base is covered with short weave nylon carpeting, pile depth 3/16th of an inch, cut to 10¼ inches by 10¼ inches with a hole in the center cut to conform to the 2 inch hole in the center of the plastic base. The post also is covered with the same short weave nylon carpeting around the circumference of the post and across the top, which has a ½ inch diameter opening centered to provide access to the fitting attached to the motor shaft. The side of the post has a 1⅜ by ½ inch opening cut into the carpeting to allow actuation of the switch. The surface of the switch is flush with the top of the carpeting.

The coiled wire to which the mouse toy is attached is 0.01 mm in diameter, measuring approximately 9½ inches in length to which at one end is attached a plastic fitting or mounting having a square cross-section measuring approximately ⅛ inch by ¼ inch and to the other end is attached the clasp part of a double locking ring or common bracelet clasp fastener. A complimentary fitting on the motor shaft is accessible through the opening in the top of the post. This fitting defines a square shaped depression that matches the square cross section of the fitting on the wire. The fitting on the wire is inserted into the square hole formed in the shaft fitting to mount the wire and toy to the motor shaft. The wire can be fit tightly or glued into the square central hole of the motor shaft fitting to reduce the chance that the animal playing with the device will knock the wire out of the motor fitting.

A ring is attached to a fabric toy in the shape of a mouse. The mouse is mounted to the wire by opening the double locking ring clasp on the wire, linking the ring on the mouse onto the clasp, and then closing the clasp. The mouse toy measures about 3 inches long by about 2 inches wide by about 1 inch thick. A yarn tail, which is about 3 inches long, is secured to the body of the mouse. The bottom of the mouse toy is constructed with a 1 inch by 2 inch opening or pocket, the edges of which are lined with a "hook and loop" type fastener (of the type commonly sold under the trademark "VELCRO"). Thus, the opening in the mouse can be opened and closed to provide access to the pocket in the mouse. The fabric toy in addition is decorated at one end with felt buttons to resemble the ears, nose and eyes of a mouse, respectively, and at the other end with a 3 inch length of nylon cord attached securely at one end so as to resemble the tail of a mouse. The mouse toy is designed to allow the pocket to be filled and refilled through the sealable opening with catnip, a substance which is attractive to cats.

More particularly, the figures show the preferred embodiment of the present invention, which is a scratching post device 10 for a cat that includes a touch activated component and motorized mechanism that moves a mouse 14 in an attempt to attract the cat to the scratching post device 10. While a scratching post is shown, the present invention contemplates any device for a pet that is animated by a touch activated component and motorized mechanism for the purpose of amusing or attracting the pet.

As with conventional scratching posts, scratching post device 10 allows a cat to groom its claws and engage in exercise and stretching. The motion of toy 14 by the touch activated component and motorized mechanism of scratching post device 10 additionally both attracts the cat to scratching post device 10 and maintains the interest of the cat with the goal of increasing the cat's use of scratching post device 10 for grooming and exercise, rather than the furnishings of the home. Referring to FIGS. 1 through 4, mouse 14 and coil spring 16 are moved by a motor 18. When the three pole on/off switch 20 of scratching post device 10 is in the "on" position and there is movement of scratching post device 10 the motor 18 momentarily moves toy 14. Thus, as a cat plays with toy 14, the cat may repeatedly contact scratching post device 10, causing motor 18 to move toy 14 in an irregular, jerky manner. This irregular motion is more apt than uniform or consistent motion to maintain the cat's attention, increasing the chances that the cat will use the scratching post.

Figure 1:
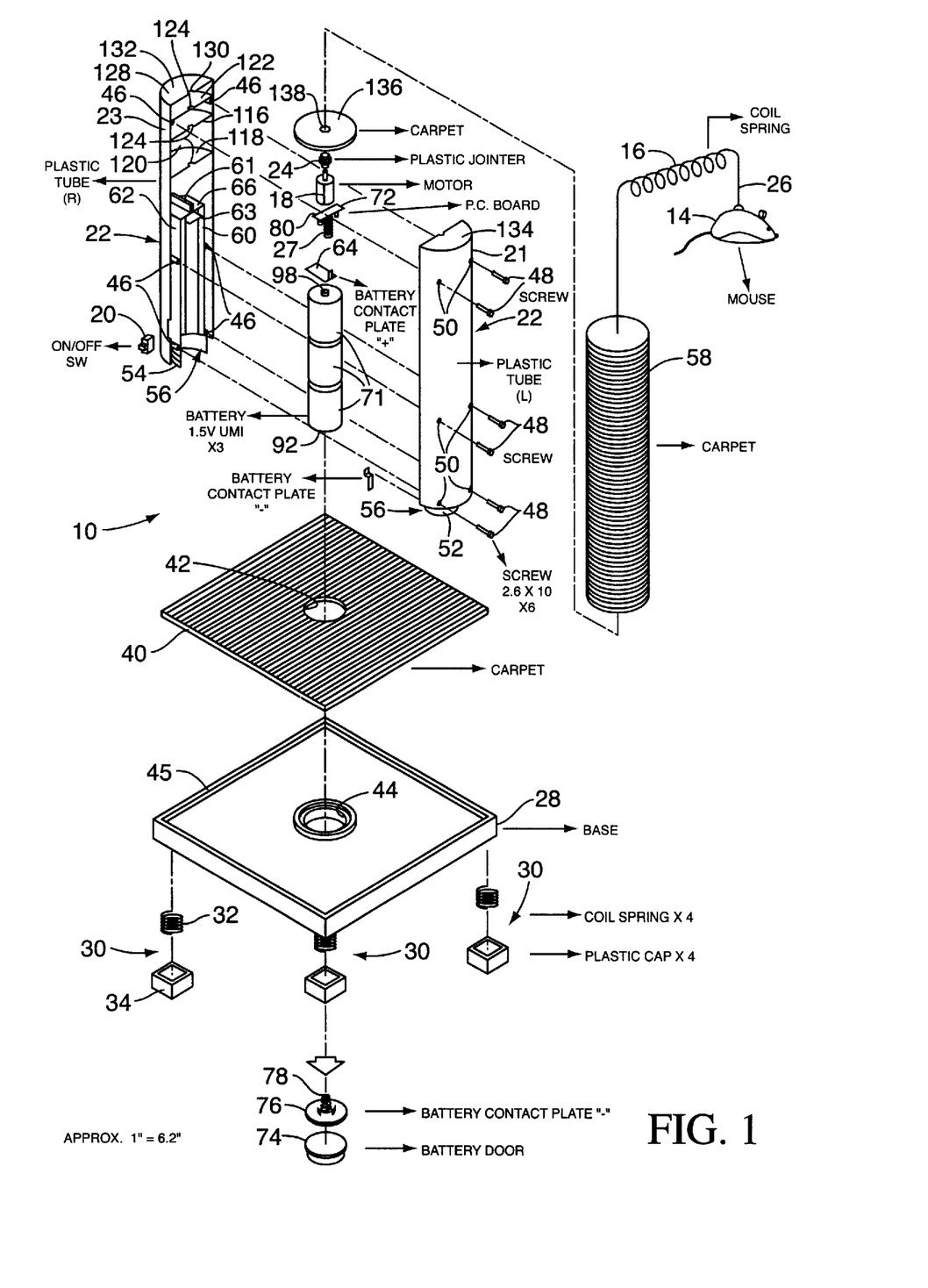
FIG. 1 is a perspective exploded view of a cat scratching post and motorized toy provided by the present invention.

Scratching post device 10 includes a fabric toy 14 in the shape of a mouse or other animal attached to the top of post 22 of scratching post device 10 by means of a 9½ inch coiled wire 16, 0.01 mm in diameter. The coiled wire 16 is attached to the top of the post 22 by a plastic fitting or mounting 25 that fits tightly into the square central opening 540 defined by a jointer or fitting 24 in such a manner that the mouse end 26 of the wire 16 can be rotated by a motor 18. Fitting 24 has a square cross section.

Figure 8:
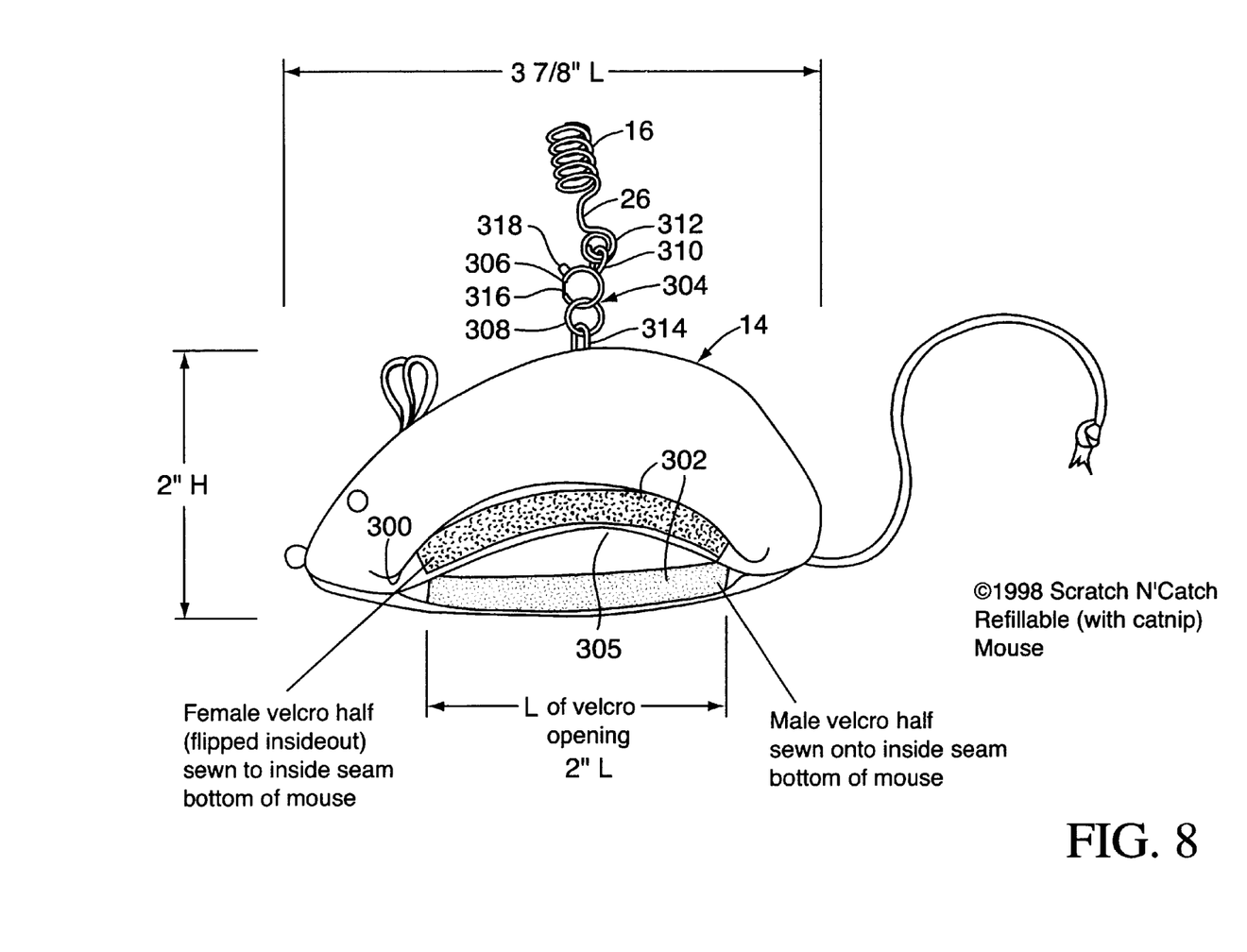
FIG. 8 is a perspective view of the mouse toy for the device shown in FIG. 1.

Referring to FIG. 8, the fabric mouse toy 14 is fashioned in such a way to allow the inside to be filled with catnip, a substance with a scent that cats find attractive. Most conventional catnip toys have been constructed in such a way as to allow limited usage; once the catnip scent inside the toy has been depleted, the usefulness of the toy as a means of attracting a cat is compromised. With scratching post device 10, however, the fabric toy 14 is constructed with a pocket 305 in a fashion that allows pocket 305 to be repeatedly refilled with catnip through an opening 300 or mouse 14 to be exchanged for another toy via a bracelet fastener 304. Pocket 305 can be sealed by means of a "hook and loop" type enclosure 302 (of the type made from components marketed under the trademark "VELCRO") at opening of pocket 305. The male and female components of fastener 302 are secured to confronting interior edges of opening 300 in a way that. tends to conceal fastener 302 when it is closed to seal opening 300 and pocket 305.

Toy 14 is removably mounted to end 26 of wire 16 using a standard bracelet fastener 304. Fastener 304 includes a ring component 308 and a clasp component 306. Clasp 306 defines a mounting ring 310. End 26 is formed into a loop through ring 310 at 312 to mount wire 16 to clasp 306. A fabric loop 314 is sewn to the body of toy 14 through ring 308 of fastener 304 to mount ring 308 to toy 14. Toy 14 is secured to wire 16 by fastening clasp 306 to ring 308. As is well known, clasp 306 includes a spring-loaded closure 316 that can be withdrawn by moving actuator 318 toward ring 310 to create a gap in ring 306. Ring 308 is inserted through the gap, the actuator is released and closure 316 is moved to its original position by the spring to trap ring 308 "within" clasp 306. Toy 14 can be removed from wire 16 in similar fashion. Therefore, fastener 304 can be used to replace toy 14 with another toy of the same or different shape. Such exchangeability, which is not a feature common to most conventional scratching posts, adds to the continued play value of the scratching post by providing a variety of toys to attract the cat.

Figure 2:
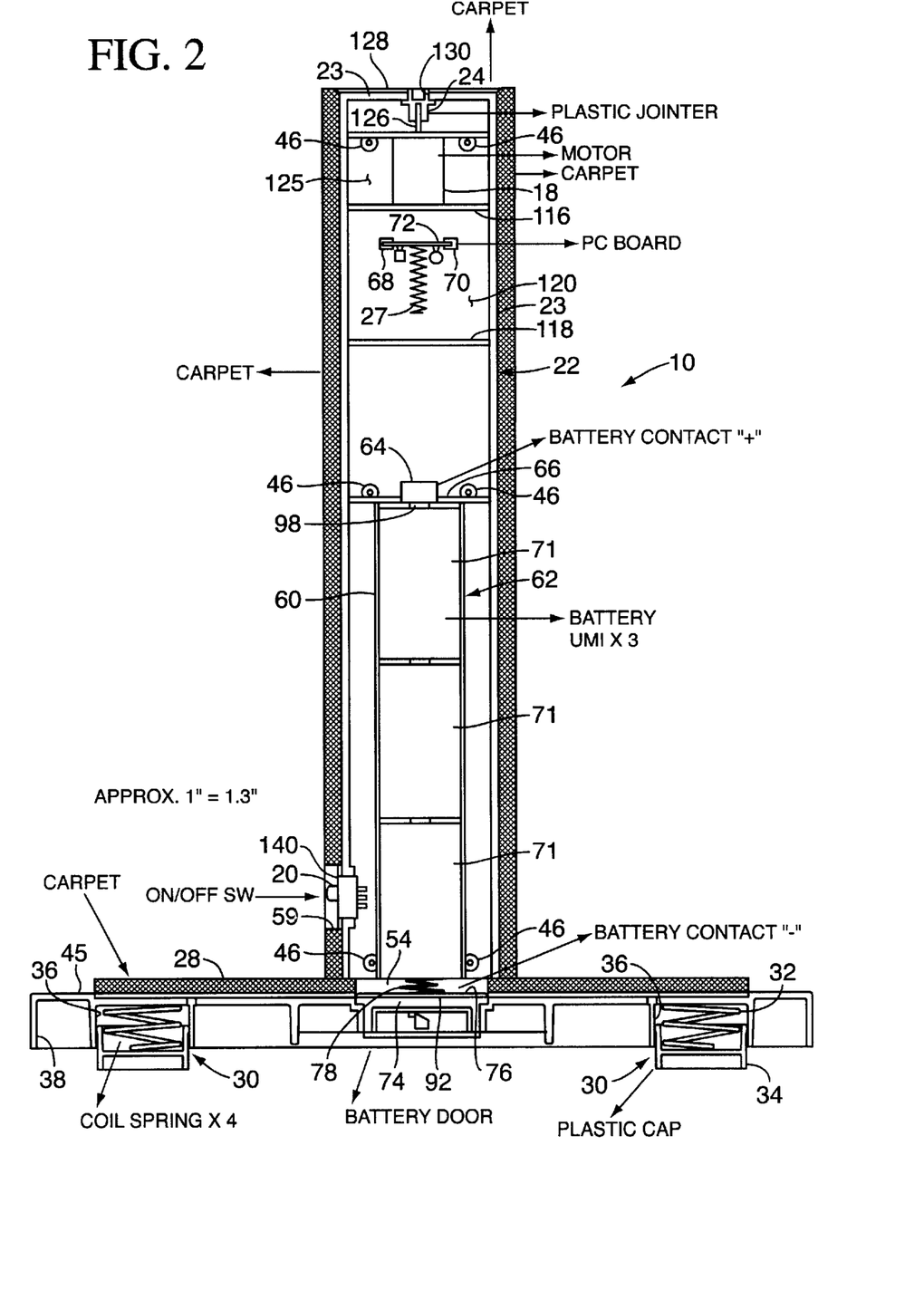
FIG. 2 is a section view of the base and post of the device shown in FIG. 1, detailing internal components including switch, battery contact, particle chip board and motor.

Referring to FIGS. 1 and 2, the mouse toy 14 is moved by motor 18 inside the post 22 by two actions. First scratching post device 10 must be turned on by means of on/off switch 20 mounted to the base of the post 22. The switch does not activate the motor 18. Instead, it makes the electrical power source (3 "D" size flashlight batteries 71) available to the touch-activated components 27 of the scratching post device 10, which, when it is activated by tapping or jolting scratching post device 10, causes the coiled spring 16 at the top of the post 22 to turn and move in a motion related to the power and frequency of the touch of the cat or person to the post 22 or base 28 of the scratching post device 10. Thus, the touch activated components 27 create an irregular pattern of movement to toy 14, which conveys a more lifelike motion to toy 14 and a greater interest for the cat, challenging the cat into play and encouraging the cat to use the scratching post device 10 for amusement, exercise and grooming.

Referring to FIGS. 1 through 4, scratching post device 10 includes a square base 28 that generally supports the remaining components of scratching post device 10 on a suitable surface. Base 28 defines a central threaded opening 44. This configuration allows for a knock down feature such that the toy is easier to store, ship and transport. Base 28 is, in turn, supported by four spring assemblies 30 (only three shown) located at the corners of base 28. These assemblies 30 allow base 28 to rock when force is exerted downwardly on base 28. When switch 20 is in the "on" position, this motion will result in power being applied to motor 18. This feature allows the cat owner to more safely play with the cat by tapping the scratching post device 10 with a foot and thus reducing the chance of getting a hand scratched. Each assembly 30 includes a coil spring 32, one end of which is mounted in a plastic cap 34. The remaining end of each spring 32 is mounted in a seat 36 defined by the undersurface of base 28. Base 28 defines a downwardly turned flange 38, which acts as a stop to movement of base 28 toward the surface that supports it.

A piece of square carpet 40 that defines a central opening 42 is secured in any suitable fashion to the upper surface of base 28. Carpet 40 is positioned on base 28 in such a fashion that openings 42 and 44 are aligned with each other. The carpet is also positioned so that it fits flush with the raised edge 45 defined by base 28 so that there is less chance of it becoming dislodged at its edges.

Post 22 is formed from two pieces of plastic tube 21 and 23 that define threaded collar halves 52 and 54, respectively. When assembled into a complete post 22, pieces 21 and 23 define a number of interior compartments for the components that are mounted inside post 22. Piece 23 defines six screw posts 46, each of which is adapted to receive a screw 48 through a hole 50 formed in piece 21, to secure piece 21 to piece 23. Piece 21 includes six screw posts (not shown) located to be aligned with screw posts 46 of piece 23 to permit screws 48 to pass through both screwposts 46 and the screw posts on piece 21. Screw posts 46 define a small collar around each of the holes formed in screw posts 46, and the screw posts in piece 21 include depressions that match the collars formed on screw posts 46, so that when pieces 21 and 23 are joined together, the collars on screw posts 46 fit into the depressions formed in the screw posts on piece 21 to stabilize post 22.

When pieces 21 and 23 are joined together, their threaded collar halves 52 and 54 form a threaded collar 56 that is threaded into threaded opening 44 through opening 42 in carpet 40 to mount post 22 to base 28. A piece of carpet 58 is wrapped around post 22 to cover the plastic outer surface of post 22 and make it useful as a scratching post to the cat. Carpet 58 defines an opening 59 through which switch 20 extends to be flush with the outer surface of carpet 58.

Piece 21 defines a battery compartment half (not shown) and piece 23 defines a battery compartment half 60 that is complementary to the battery compartment half defined by piece 21, which form a battery compartment 62 when pieces 21 and 23 are joined together. A nickel plated steel battery contact plate 64 is mounted by a friction fit to battery compartment 62 adjacent top 66 of compartment 62. The top of half 60 defines a stiffening ridge 61 that stabilizes contact 64. Half 60 also defines a shelf 63 that fits within a corresponding cutout formed in the top of the compartment half formed by piece 21. Compartment 62 is adapted to receive three 1.5 volt size "D" "flashlight" batteries 71. Batteries 71 are inserted into and removed from within compartment 62 by removing post 22 from base 28, and inserting batteries 71 into compartment 62 through the opening at the bottom of collar 56. Alternately, batteries 71 can be inserted into compartment 62, without disassembling post 22 from base 28, through opening 44 in base 28, and opening 42 in carpet 40.

Batteries 71 are secured within compartment 62 by battery door 74, to which a nickel coated steel battery contact plate 76 and an electrically conducting spring 78 are mounted, all of which are shown in detail in FIGS. 3, 5, 6 and 7. Door 74 defines an upper mounting surface 500 to which plate 76 and spring 78 are mounted, and a central rib 502 on its lower surface 504 that is used to turn door 74. Circumferential collar 506 defines a pair of keyways 508 (only one shown) on opposing sides of collar 506, each keyway defining an entrance section 510 and a travel section 512. The size and shape of collar 506 permits it to be inserted into collar 56 of post 22. The shape and location of keyway 508 matches those of keys 514 (only one shown) defined on opposing sides of the interior of collar 56. Accordingly, door 74 is mounted to collar 56 by aligning keyway entrances 510 with keys 514, pushing door collar 506 into collar 56, until keys 514 are aligned with travel keyways 512, and rotating door 74 until keys 514 reach their limits of travel within keys 512. Each keyway 512 can define a longitudinal rib 516 that provides enough resistance to travel of key 514 into and out of keyway 512 that inhibits unintended rotation of door 74 when it is mounted in place, yet permits the user to force keys 514 into keyways 512 to the limits of their travel when mounting door 74 onto collar 56. Circumferential flange 538 defined by door 74 provides additional protection against collar 506 being inserted too far into collar 56.

Figures 3, 4:
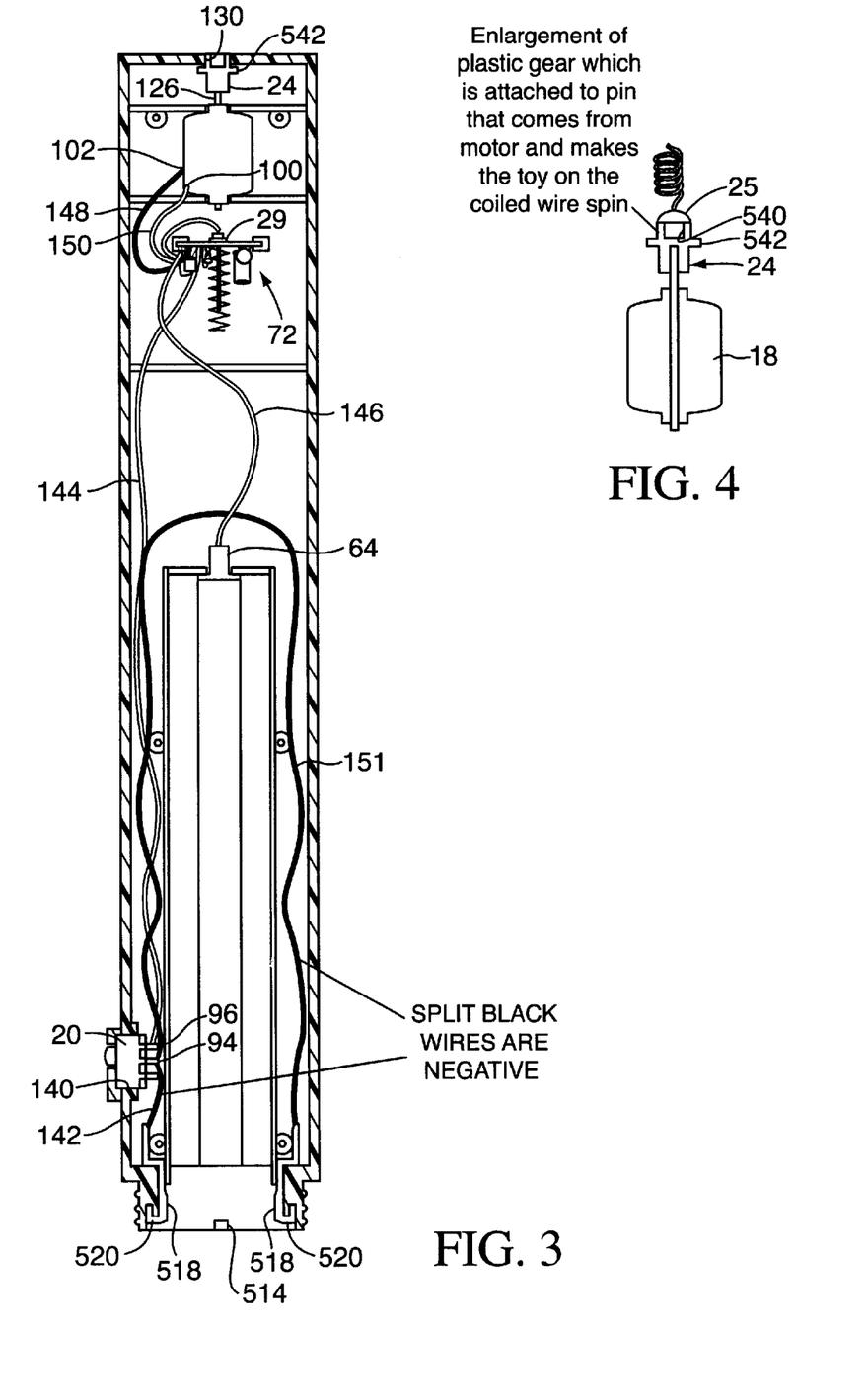
FIG. 3 is a section view of the device shown in FIG. 1, showing the wiring of the device.
FIG. 4 is a diagrammatic view showing the motor and motor shaft fitting.
Figure 5A:
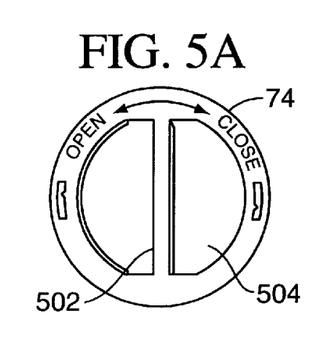
FIG. 5A is a top plan view of the battery closure door for the device shown in FIG. 1.
Figure 5B:
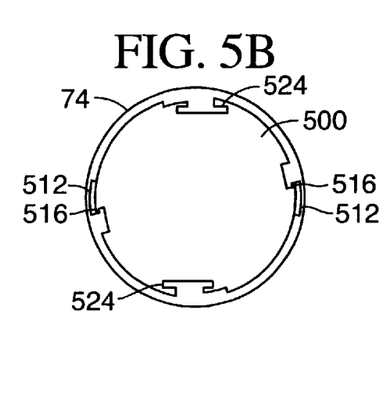
FIG. 5B is a bottom plan view of the battery closure door for the device shown in FIG. 1.
Figure 5C:
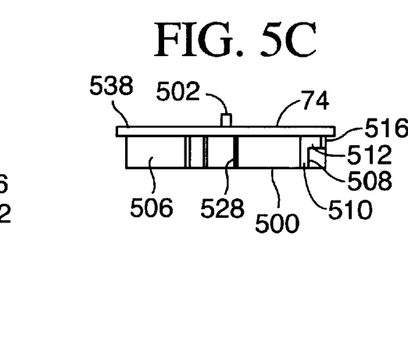
FIG. 5C is a side view of the battery closure door for the device shown in FIG. 1.
Figure 6A:
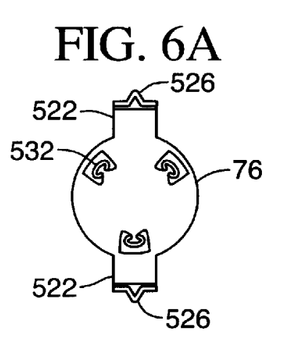
FIG. 6A is a top plan view of the battery contact plate for the device shown in FIG. 1.
Figure 6B:
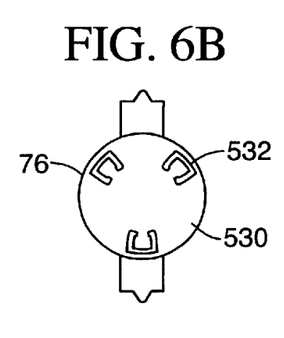
FIG. 6B is a bottom plan view of the battery contact plate for the device shown in FIG. 1.
Figure 6C:
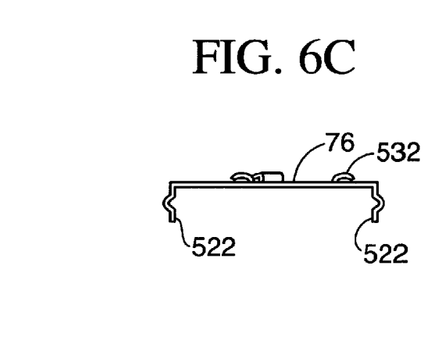
FIG. 6C is a side view of the battery contact plate for the device shown in FIG. 1.
Figure 7:
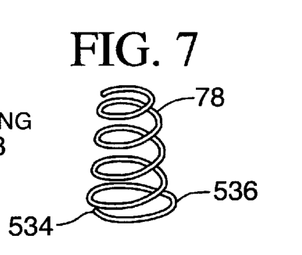
FIG. 7 is a side view of the spring for the battery closure door of the device shown in FIG. 1.

A pair of negative battery contacts 518 are friction mounted to the bottom of collar 56 of post 22 as shown in FIG. 3. Each contact 518 defines a lip 520 that is forced into a corresponding groove formed in the interior surface of collar 56. Battery door contact plate 76 makes contact with contacts 518 when door 74 is mounted in place. Plate 76 defines a pair of mountings 522 on opposite sides of plate 76, which are used to mount plate 76 to door 74. Each mounting 522 is force fit into a slot 524 defined by upper surface 500 of door 74. Each mounting 522 defines a contact boss 526 that extends slightly through an opening 528 (only one shown) to make contact with a contact plate 518 when door 74 is in place on collar 56. Upper surface 530 of plate 76 defines three loops 532 that are formed by punching a "tab" from the material of plate 76, and folding the free end of the tab over until it forms a loop 532. Tapered spring 78 is secured to upper surface 530 of plate 76 by inserting free end 534 of the larger end ring 536 of spring 78 into successive loops 532 until the entire lower ring 536 is completely threaded through all three loops 532.

Referring to FIGS. 1, 2 and 3, the interior surface of piece 23 defines a pair of mountings 116 and 118. The interior surface of piece 21 defines a pair of compartment halves (not shown) that are complimentary to halves 116 and 118. Halves 116 and 118 and the halves defined by the interior of piece 21 define a PC board compartment 120 that houses PC board 72.

PC board 72 is mounted within compartment 120 using PC board mountings 68 and 70 defined by the interior surface of piece 23. Edge 80 of PC board 72 is inserted into slots formed in mounts 68 and 70 to mount it by a friction fit to piece 23. The edge of board 72 that is opposite edge 80 fits against a pair of posts defined by the interior surface of piece 21 when pieces 21 and 23 are joined to each other. These posts provide additional assurance that PC board 72 will not slide out of mountings 68 and 70 during use of scratching post device 10.

The interior surface of piece 23 also defines a mounting half 122, and the interior surface of piece 21 defines a mounting half (not shown) that is complimentary to half 122. When pieces 21 and 23 are joined together, halves 122 and 116 and the identical halves defined by the interior surface of piece 21 define a housing 124 for motor 18. Motor 18 is mounted to halves 122 and 116 and the corresponding halves defined by piece 21 using indentations 124 (only two shown) defined by those halves. Indentations 124 form openings into which the ends of the shaft 126 of motor 18 are inserted to mount motor 18 loosely to the halves when pieces 21 and 23 are joined together.

One end of fitting 24 is mounted to shaft 126 of motor 18, and fitting 24, therefore, turns whenever motor 18 is energized. A top 128 is formed by top half 132 defined by piece 23 and top half 134 defined by piece 21 when pieces 21 and 23 are joined together. Top 128 defines an opening 130 into which the remaining end of fitting 24 is inserted. A plastic fitting 25 is secured to one end of wire 16 and then mounted to fitting 24 by a friction fit or both a friction fit and glue into a square central opening 540 formed in fitting 24. Thus, wire 16 turns as fitting 24 is moved by motor 18. Fitting 24 defines a circumferential flange 542, which stabilizes fitting 24 against any forces that would tend to pull fitting 24 through opening 130. Top 128 is covered by a circular piece of carpet 136, which is secured to top 128 in any suitable fashion. Carpet 136 defines an opening 138, which allows the end 26 of wire 16 and fitting 25 to pass through carpet 136.

Piece 23 defines an indentation 140 that is used to mount switch 20 to post 22. The edge of piece 21 holds switch 20 in place within indentation 140 when pieces 21 and 23 are joined together.

FIGS. 2 and 3 show generally the wiring arrangement for scratching post device 10. A negative lead 142 is connected between a first battery contact plate 518, which makes contact with the negative battery terminal 92 of the lower battery 71 through battery contact plate 76 and spring 78, and terminal 94 of switch 20. A lead 151 is connected between terminal 94 of switch 20 and the remaining contact 518. Leads 151 and 142 provide a redundant connection between the negative battery terminal 92. A lead 144 is connected between a second terminal 96 of switch 20 and the junction of the CD8050 transistor and capacitor 110 on PC board 72. A positive lead 146 is connected between contact 64, which makes contact with positive terminal 98 of the top battery 71, and the junction of the collector of the CD9014 transistor and end 112 of pin 84 on board 72. A lead 148 is connected between the junction of the collector of the CD9014 transistor and end 112 of pin 84 on board 72 and positive terminal 102 of motor 18. A lead 150 is connected between the collector of the CD8050 transistor and terminal 100 of motor 18.

Figure 2A:
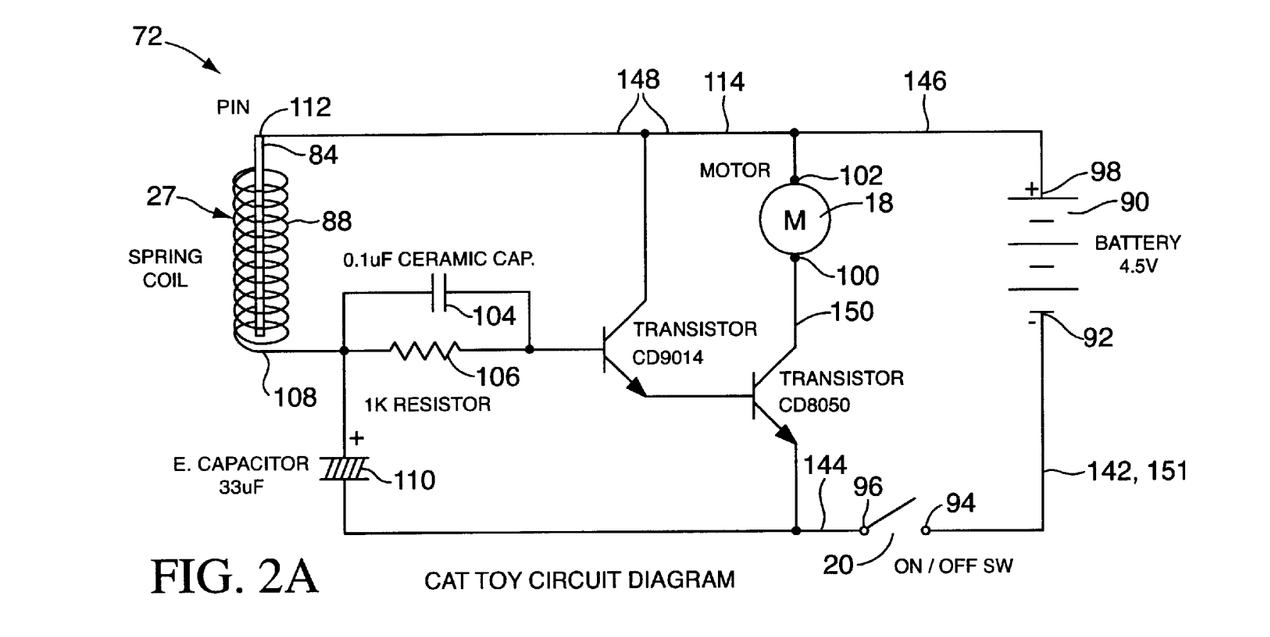
FIG. 2A is a schematic drawing of the electrical circuitry of the device shown in FIG. 1.
Figure 2B:
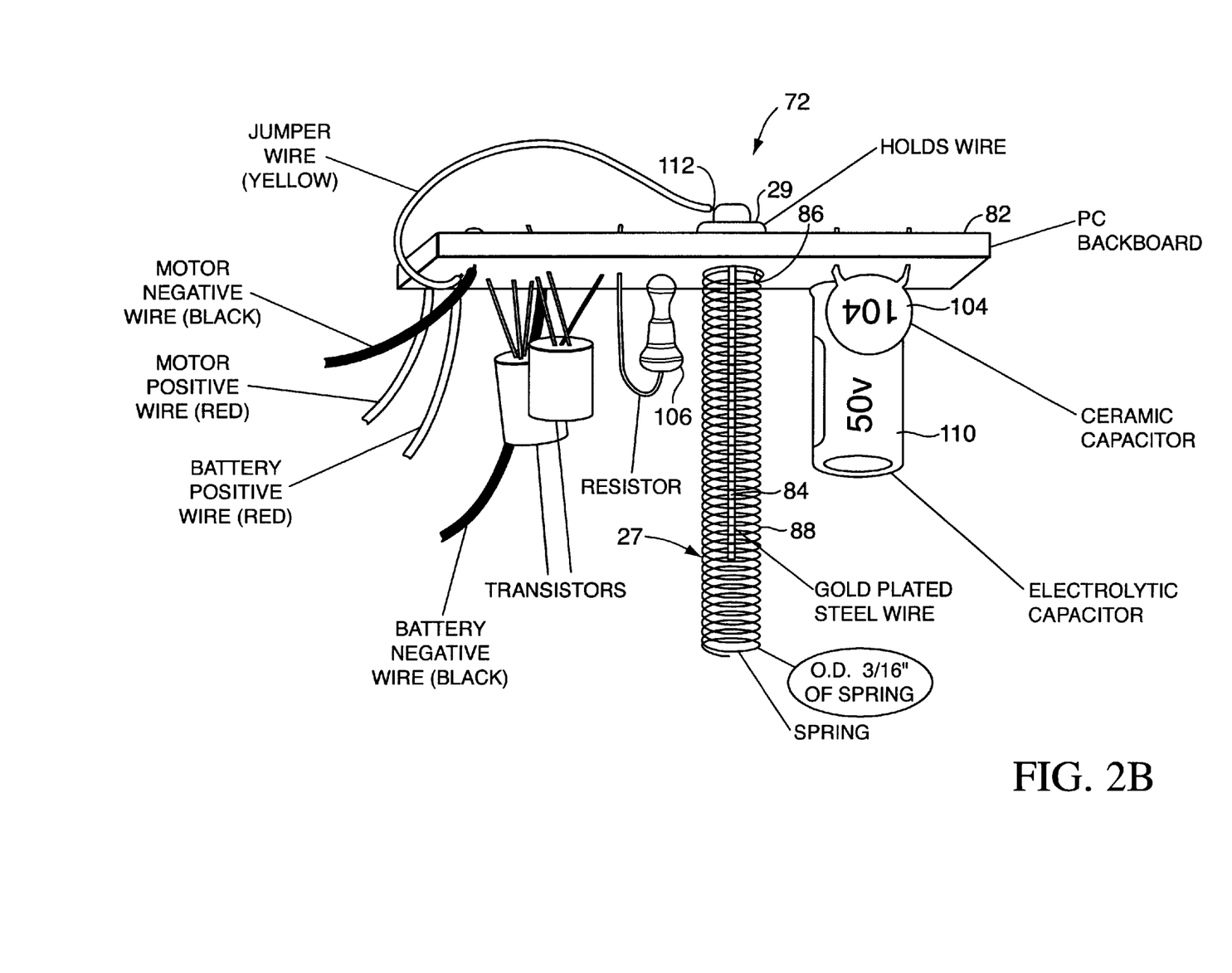
FIG. 2B is a graphical view of the particle chip board of the device shown in FIG. 1.

FIG. 2B shows the pertinent components and details of PC board 72 and its wiring, including touch activated components 27. PC board or particle chip board includes a PC backboard 82 to which the components of board 72 are mounted. Touch activated components 27 include a ¾ inch long gold plated steel pin 84 that extends through a hole 86 formed in backboard 82. Pin 84 extends through board 72 and is held in place by a plate 29 and glue applied to the plate and the upper surface of board 72. Touch activated component 27 also includes a 1 inch long by 3/16 inch diameter coil spring 88 having 42 turns that is connected to the underside of backboard 82 by a solder joint around opening 86. Spring 88 surrounds pin 84. When scratching post device 10 is at rest, pin 84 does not touch spring 88. When scratching post device 10 is moved, for example, when base 28 or post 22 is tapped or jolted, spring 88 swings from its position of rest and, depending on how great a force is applied to scratching post device 10, it can come into contact with pin 84. Referring also to FIGS. 4 and 8, when spring 88 is in contact with pin 84 and switch 20 is in the "on" position, the circuit is closed and motor 18 is energized by batteries 71, and wire 16 and mouse 14 begin to move. When spring 88 breaks contact with pin 84, motor 18 is deenergized, and rotation of mouse 14 stops. In normal play, a cat will tend to repeatedly "bat" different parts of scratching post device 10, causing intermittent and irregular contact between pin 84 and spring 88, which, in turn, causes intermittent and irregular movement of wire 16 and mouse 14. The elasticity of wire 16 makes the movement of mouse 14 even more intermittent and irregular. The length and diameter of the coil 88, as well as the characteristics of the wire forming coil 88, determine the dynamics of coil 88, and the nature of the motion provided to toy 14. The greater the flexibility of coil 88, the greater the movement of coil 88 when scratching post device 10 is tapped or jolted, and the more frequent the contact between coil 88 and pin 84, which causes more and more irregular movement of toy 14. The flexibility of coil 88 can be increased by lengthening coil 88, increasing the diameter of coil 88, or increasing the elasticity of the wire making up coil 88.

Figure 2C:
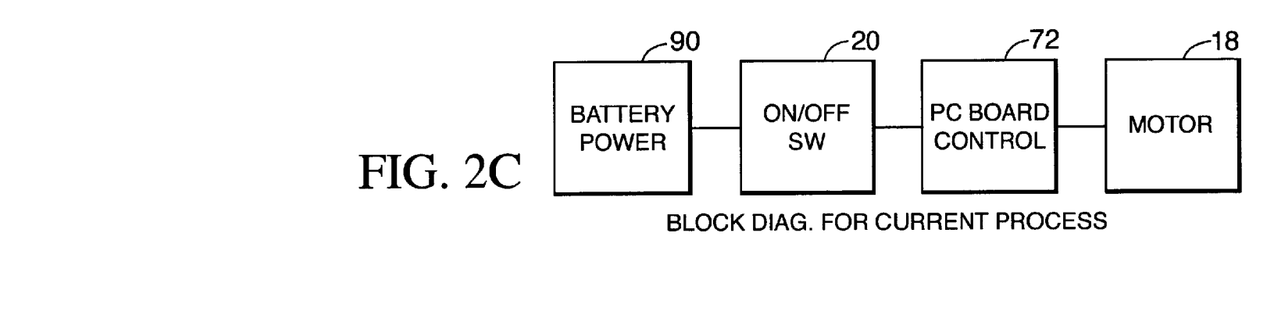
FIG. 2C is a block diagram of the electrical circuitry of the device shown in FIG. 1.

FIG. 2C shows very generally the electrical arrangement for scratching post device 10. Battery power 90, consisting of the three batteries 71, supplies power to PC board 72. PC board 72 controls the energization of motor 18. FIG. 2A is a schematic diagram of the circuitry represented in FIG. 2C.

Referring also to FIGS. 2, 3, and 4, battery power 90, consisting of the three 1.5 volt, size "D" batteries 71, are connected at negative terminal 92 to terminal 94 of switch 20 through contact plate 76 and contacts 518. The other terminal 96 of switch 20 is connected to the emitter of the CD8050 transistor, which is operated in the switching mode, through battery contact 64. The collector of the CD8050 transistor is connected to a first terminal 100 of motor 18. The positive terminal 98 of battery power 90 (see FIGS. 1 and 2A) is connected to terminal 102 of motor 18. Accordingly, power is supplied to motor 18 from battery 90 when transistor CD8050 is closed and switch 20 is in the "on" position and spring 88 contacts pin 84. Transistor CD8050 closes to energize motor 18 when pin 84 touches spring 88 of device 27. PC board 72 also includes a CD9014 transistor whose base is connected to the junction of a 0.1 microfarad ceramic capacitor 104 and a 1 kohm resistor 106. Capacitor 104 and resistor 106 are connected together in parallel. The other junction of capacitor 104 and resistor 106 is connected to the junction of one end 108 of spring 88 and the positive end of an L.H.C. 33 microfarad electrolytic capacitor 110. End 112 of pin 84 is connected to the junction 114 of the collector of the CD9014 transistor and terminal 102 of motor 18. Capacitors 104 and 110, resistor 106 and the 9014 transistor act as an amplifier for the input to the 8050 transistor. Capacitor 110 becomes charged when pin 84 is in contact with spring 88 and, after contact is subsequently broken between pin 84 and spring 88, the charge on capacitor 110 maintains the CD8050 transistor in its "ON" state until the voltage across capacitor 110 falls to a level that is insufficient to maintain the CD8050 transistor on. Thus, motor 18 continues to turn for a short time after contact is broken between pin 84 and spring 88.

In operation, switch 20 is first moved to the "ON" position to make battery power available to the circuitry of scratching post device 10. If a person or a cat is attracted to play with scratching post device 10 and jolts base 28 or post 22 with sufficient force, the resulting movement will cause spring 88 to swing into contact with pin 84. Power from batteries 71 (as represented by reference character 90 in FIG. 2A) will thus flow through pin 84, to spring 88 through the point at which spring 88 is in contact with pin 84, through capacitor 110 and switch 20. The voltage developed across capacitor 110 will be amplified by capacitor 104, resistor 106 and the CD9014 transistor. This amplified voltage will turn on the CD8050 transistor. With the CD8050 transistor turned on, current will flow from batteries 71, through switch 20 and the CD8050 transistor to motor 18, which will begin to turn. When motor 18 turns, fitting 24 will cause fitting 25 and wire 16 to turn, thus moving mouse 14. When the cat ceases its contact with scratching post device 10, spring 88 will eventually return to its rest position shown in FIG. 2B and breaking electrical contact between spring 88 and pin 84. When contact between spring 88 and pin 84 is broken, current no longer flows through capacitor 110, and capacitor 110 begins to discharge. When the voltage across capacitor 110 falls to a point where the CD9014 transistor can no longer hold the CD8050 transistor in the "ON" state, the CD8050 transistor opens, removing power from motor 18. When motor 18 stops, rotation of fitting 24 and wire 16 stops, although inertia and the action of wire 16 may continue to impart irregular motion to mouse 14. As long as the cat remains interested in this movement of mouse 14, the cat will continue to "play" with scratching post device 10 and repeatedly and irregularly contact it, causing irregular repetition of the foregoing process, with the result that the mouse will undergo irregular and intermittent movement.

This irregular and intermittent movement will increase the chances that the cat will use the scratching post for grooming and exercise, due to the lifelike nature of the mouse.

What is claimed is:

1. A device for attracting the attention of an animal, said device including a touch sensitive switch and a motorized mechanism that is actuated through said touch sensitive switch, said touch sensitive switch being actuable by irregular touching of the device to cause actuation of said motorized mechanism to effect irregular movement of an object, whereby the irregular movement of the object is intended to attract the attention of an animal.

2. The device recited by claim 1 wherein the movement of the object is irregular.

3. The device recited by claim 2 wherein movement of the object continues for an indeterminate period of time after movement of the device has ceased.

4. The device recited by claim 3 wherein the device is a scratching device.

5. The scratching post recited by claim 4 further comprising a spring loaded base that provides sensitivity to said touch activated mechanism when said scratching device is touched or moved.

6. The device recited by claim 3 wherein the object is removably mounted to the device, whereby one said object can be exchanged for another said object.

7. The device recited by claim 3 wherein the object defines a reclosable pocket for containing catnip.

8. The device recited by claim 1 wherein said device further comprises a second switch connected in series with said touch sensitive switch to form a double switch system both said switches functioning together to apply a source of power to said mechanism when both said switches are closed, closing of said touch sensitive switch being caused by a person or animal touching said device, in order to conserve the source of power by said device when said device is not in use.

9. The device recited by claim 8 wherein said touch sensitive switch is configured as a post and spring that come into contact with each other due to movement caused by touching of the device by a person or animal.

10. A device that moves an object to attract the attention of an animal, comprising:

a base;

an object mounted to said base for movement relative thereto; and a source of irregular motion for said object;

and wherein said source of irregular motion is activated by movement of said device, movement of the object continues for an indeterminate period of time after movement of the device has ceased, said device is a scratching post, and said base is spring loaded.

11. The scratching post recited by claim 10 wherein the object is removably mounted to the scratching post, whereby one said object can be exchanged for another said object.

12. The scratching post recited by claim 11 wherein the object defines a reclosable pocket for containing catnip.

13. The device recited by claim 10 wherein said device includes a post that can be removed from said base.

14. A scratching post for an animal comprising:

a base;

a post secured to said base;

an object mounted to said post for movement relative thereto;

a touch sensitive switch; and a motor for providing motion to said object;

said touch sensitive switch being actuable by touching of said scratching post to cause actuation of said motor to provide irregular motion to said object when said scratching post is irregularly touched by the animal or a person.

15. The scratching post recited by claim 14 wherein movement of said object continues for an indeterminate period of time after actuation of said touch sensitive switch has ceased.

16. The scratching post recited by claim 14 wherein said base is spring loaded.

17. The scratching post recited by claim 14 wherein said object is removably mounted to said post, whereby one said object can be exchanged for another said object.

18. The scratching post recited by claim 17 wherein said object is refillable with catnip.

19. A touch-actuated device that moves an object to attract the attention of an animal, comprising:

a motor operatively associated with the object, said motor causing movement of the object when said motor is activated by a source of energy; and a touch sensitive switch, said motor being activated by a source of energy through said touch sensitive switch when said touch sensitive switch is closed;

whereby irregular touching of said device causes irregular movement of the object.

20. The device recited by claim 19, wherein said motor is an electric motor.

21. The device recited by claim 20 further comprising a manually operated switch that is adapted to be placed in operative association with a source of electrical energy and that can be closed to make the source of electrical energy available to said touch sensitive switch.

* * * * *